US008908516B2

(12) United States Patent  (10) Patent No.: US 8,908,516 B2
Tzamaloukas et al.  (45) Date of Patent: Dec. 9, 2014

(54) MAINTAINING STABILITY OF A WIRELESS NETWORK BY ADJUSTING TRANSMITTING PERIOD

(75) Inventors: Assimakis Tzamaloukas, San Jose, CA (US); P. Michael Farmwald, Portola Valley, CA (US)

(73) Assignee: BlackBerry Corporation, Waterloo (CA)

( * ) Notice: Subject to any disclaimer, the term of this patent is extended or adjusted under 35 U.S.C. 154(b) by 295 days.

(21) Appl. No.: 13/220,237

(22) Filed: Aug. 29, 2011

(65) Prior Publication Data

US 2011/0310733 A1  Dec. 22, 2011

Related U.S. Application Data

(62) Division of application No. 10/272,039, filed on Oct. 15, 2002, now abandoned.

(51) Int. Cl.
*H04L 12/26* (2006.01)
*G08G 1/01* (2006.01)
*H04W 28/06* (2009.01)
*G01C 21/36* (2006.01)
*H04L 12/801* (2013.01)
*H04W 84/18* (2009.01)

(52) U.S. Cl.
CPC ............ *G08G 1/0104* (2013.01); *H04W 28/06* (2013.01); *G01C 21/3691* (2013.01); *H04W 84/18* (2013.01); *H04L 47/12* (2013.01); *H04L 47/10* (2013.01); *H04L 47/14* (2013.01)
USPC ........................................................ 370/232

(58) Field of Classification Search
USPC ................................................. 370/230, 232
See application file for complete search history.

(56) References Cited

U.S. PATENT DOCUMENTS

| 4,350,970 | A | | 9/1982 | Von Tomkewitsch |
| 4,633,462 | A | * | 12/1986 | Stifle et al. .................... 370/448 |

(Continued)

FOREIGN PATENT DOCUMENTS

| WO | 9427265 A1 | 11/1994 |
| WO | 9530882 A2 | 11/1995 |
| WO | 0034932 A | 6/2000 |

OTHER PUBLICATIONS

Notice of Allowance and Fee(s) Due mailed Jan. 15, 2010; in corresponding application No. 200380101515.0.

(Continued)

*Primary Examiner* — Man Phan
*Assistant Examiner* — Kevin Lee
(74) *Attorney, Agent, or Firm* — Novak Druce Connolly Bove + Quigg LLP

(57) ABSTRACT

An enhanced mobile communication device communicates directly with other enhanced mobile communication devices in an ad-hoc mode over a wireless medium. The device transmits and receives packets of digital data. The packets of digital data are such that when transmitted, the probability that they will be received by the other mobile communication devices is increased. The probability is further increased by transmitting the packets a multiple and variable number of times according activity in the wireless medium. Attempts to transmit are made periodically and the period of transmission is adjusted according to activity in the wireless medium. In a transportation application, the packets comprise vehicle traffic congestion update information. The device maintains a traffic database and a map database. Traffic congestion update information is exchanged with other devices. Routes through the map from a source or current position of the device to a destination are computed according to an analysis of the traffic database.

22 Claims, 8 Drawing Sheets

(56) References Cited

U.S. PATENT DOCUMENTS

| | | |
|---|---|---|
| 5,541,845 A | 7/1996 | Klein |
| 5,610,821 A | 3/1997 | Gazis et al. |
| 5,732,383 A | 3/1998 | Foladare et al. |
| 5,751,245 A | 5/1998 | Janky |
| 5,933,114 A | 8/1999 | Eizenhofer et al. |
| 5,953,722 A | 9/1999 | Lampert et al. |
| 6,101,443 A | 8/2000 | Kato et al. |
| 6,131,067 A | 10/2000 | Girerd et al. |
| 6,208,290 B1 | 3/2001 | Krasner |
| 6,236,933 B1 | 5/2001 | Lang |
| 6,252,544 B1 | 6/2001 | Hoffberg |
| 6,282,486 B1 | 8/2001 | Bates et al. |
| 6,292,745 B1 | 9/2001 | Robare et al. |
| 6,317,686 B1 | 11/2001 | Ran |
| 6,393,149 B2 | 5/2002 | Friederich et al. |
| 6,460,046 B1 | 10/2002 | Meek |
| 6,490,519 B1 | 12/2002 | Lapidot et al. |
| 6,498,569 B2 | 12/2002 | Dijkstra |
| 6,532,368 B1 | 3/2003 | Hild et al. |
| 6,571,279 B1 | 5/2003 | Herz et al. |
| 6,608,554 B2 | 8/2003 | Lesesky et al. |
| 6,615,130 B2 | 9/2003 | Myr |
| 6,711,493 B1 | 3/2004 | Andrews et al. |
| 6,744,352 B2 | 6/2004 | Lesesky et al. |
| 6,756,884 B1 | 6/2004 | Dijkstra |
| 6,791,471 B2 | 9/2004 | Wehner |
| 6,791,472 B1 | 9/2004 | Hoffberg |
| 2002/0011949 A1 | 1/2002 | Rudow et al. |
| 2002/0080768 A1 | 6/2002 | Garcia-Luna-Aceves |
| 2002/0082767 A1 | 6/2002 | Mintz |
| 2002/0115436 A1 | 8/2002 | Howell et al. |
| 2002/0120389 A1 | 8/2002 | Fushiki et al. |
| 2002/0140548 A1 | 10/2002 | Lutter et al. |
| 2002/0141479 A1 | 10/2002 | Garcia-Luna-Aceves |
| 2002/0150050 A1 | 10/2002 | Nathanson |
| 2003/0069683 A1 | 4/2003 | Lapidot et al. |
| 2003/0102997 A1 | 6/2003 | Levin et al. |
| 2003/0129985 A1 | 7/2003 | Naden et al. |
| 2004/0039520 A1 | 2/2004 | Khavakh et al. |
| 2010/0030423 A1* | 2/2010 | Nathanson ............ 701/35 |

OTHER PUBLICATIONS

Notice of Allowance and Fee(s) Due mailed Sep. 23, 2009; in corresponding application No. 03781356.5.

First Office Action mailed Aug. 17, 2007; in corresponding application No. 200380101515.0.

Examination Report mailed Apr. 17, 2004; in correspondent application No. 03781356.5.

Garmin StreetPilot III product description sheet. Printed from http://www.Garmin.com/products/spIII/ data known.

Briesemeister, Linda and Gunter Hummel, "Disseminating Messages among Highly Mobile Hosts based on Inter-Vehicle Communication", IEEE intelligent Vehicles Symposium, Oct. 3-5, 2000, Dearborn, MI, USA.

Anwar, F. and J. Dunlop, A packet based data link protocol for implementing RTI related services using cellular radio, Vehicular Technology Conference, 1944 IEEE 44th Stockholm, Sweden, Jun. 8-10, 1994, New York, NY, USA.

Supplemental EPO. Search Report dated Aug. 13, 2007.In corresponding application No. 03781356.5.

International Search Report dated Jan. 25, 2005. In corresponding application No. PCT/US03/33314.

Advisory Action dated Jun. 9, 2008. In corresponding U.S. Appl. No. 10/272,039.

Advisory Action dated Aug. 5, 2008. In corresponding U.S. Appl. No. 10/272,039.

Final Office Action dated Feb. 12, 2008. In corresponding U.S. Appl. No. 10/272,039.

Final Office Action dated Oct. 3, 2005. In corresponding U.S. Appl. No. 10/272,039.

Non-Final Office Action dated Feb. 11, 2005. In corresponding U.S. Appl. No. 10/272,039.

Non-Final Office Action dated May 31, 2011. In corresponding application No. 10/272,039.

Non-Final Office Action dated Aug. 10, 2007. In corresponding U.S. Appl. No. 10/272,039.

* cited by examiner

MAINTAINING STABILITY OF A WIRELESS NETWORK BY ADJUSTING TRANSMITTING PERIOD

CROSS-REFERENCE TO RELATED APPLICATIONS

This application is a divisional application of U.S. patent application Ser. No. 10/272,039 filed on Oct. 15, 2002, now abandoned said application is expressly incorporated by reference herein in its entirety.

BACKGROUND

Ad-hoc wireless networks are networks that are formed and de-formed on-the-fly without the need for system administration. Ad-hoc networks can be mobile, standalone, or networked with other networks such as wide area networks or the Internet. Ad-hoc wireless devices communicating in a wireless area network are able to detect the presence of other ad-hoc devices, establish communication links with the other devices, and communicate information such as packetized digital data. An ad-hoc network is essentially infrastructure-less since there is no need for fixed radio base station, wires, or routers in the network. In communicating with each other, ad-hoc devices may employ many different packet routing methods to route wireless digital packets between mobile hosts in an ad-hoc mobile network.

One wireless networking protocol of significant importance due in part to its growing use in devices such as palmtop computers, personal digital assistants (PDAs), laptop computers, and Internet mobile phones is IEEE 802.11. The 802.11 standard specifies two modes of operation: an infrastructure mode where an access point provides the link between wireless stations and wireline legacy infrastructure, and an ad-hoc mode where there is no access point, and wherein all stations contribute to the distributed management and control of the network.

802.11 equipped devices configured to run in infrastructure mode are especially well suited for office, home, or café environments where there is an access point, and where the concentration of mobile devices is relatively low and the mobile devices are slow moving or stationary. For example, in a café or office setting a mobile device such as a laptop computer may enter a wireless network and remain stationary for a long period of time while the user of the device accesses other devices or other networks, such as the Internet. Location and context based mobile services are another infrastructure mode application. For example, a user in a shopping mall could obtain the lowest price for a product they are interested in. Or, a user at an art museum could automatically receive on their PDA more detailed information on a work of art as they approach to view the work of art.

Mobile ad-hoc devices can automatically recognize the presence of and communicate with other compatible ad-hoc wireless devices. For example, when two or more people meet at conference they may form an ad-hoc network to exchange data between their wireless ad-hoc mode enabled PDAs or laptop computers. In another application, a user's ad-hoc device communicates with home wireless devices to unlock doors, activate lights and home audio and video equipment units, adjust heating and cooling settings, and the like. These applications are similar in that the network is formed spontaneously, and the mobile device need only communicate small amounts of data in order to carry out the application.

Still another mobile ad-hoc application is car-to-car mobile communications whereby ad-hoc mobile communication devices in cars will allow the formation and de-formation of ad-hoc wireless networks with other cars. These networks could be used to send alert messages to motor vehicle operators, including alerts to traffic accidents, traffic congestion, weather reports, emergency vehicles en-route, and the like.

Unlike the other examples above, car-to-car mobile communications present significantly greater challenges since, at the very least, the communication devices present in the vehicles are moving extremely fast relative to each other. For example, while some vehicles may be traveling on a highway in the same direction within close proximity to each other, others are moving in opposite direction. If the vehicles are traveling 60 mph, the mobile devices may be traveling 120 mph relative to each other. This, in addition to the relatively limited range of 802.11, presents only a very small communication window within which to set up communication links, and transmit and receive information in a reliable fashion. Typically, the range for outdoor communication using 802.11 is between 0.5 and 1 mile. In above example, for vehicles moving in opposite directions, this translates to a communication window of between 10 and 30 seconds. Additionally, due to the small window, it may only be possible to transmit a very small amount of data before the devices are out of range of each other. Further, in a transportation network with many vehicles equipped with 802.11 devices, or radios, there may be hundreds or thousands of radios within range of each other at any particular moment in time. Current ad-hoc mobile protocols are generally not suitable for coping with such a high concentration of radios, in addition to the extremely short windows with which to set up links and transmit data.

One of the more popular devices found in automobiles today are Global Positioning System (GPS) navigation devices. Several manufacturers offer GPS navigation devices that provide varying degrees of information from basic position as indicated by latitude and longitude, speed, and direction, to detailed driving directions to a destination. For example, the Garmin StreetPilot III provides real-time location information overlaid onto a map. Exemplary devices such as the StreetPilot III also provide real-time driving directions en-route to a destination through audible or visual commands emanating from the device.

Typically, navigation devices include an interface port, such as a serial or universal serial bus (USB) port, for interfacing to an external computing or storage device such as a laptop computer. Additionally, devices may also include a non-volatile storage medium, such as a removable flash memory card. The port and memory card are used to download maps and planned routes onto the device. Maps such as city and interstate road maps, topographical maps, recreational maps, and the like are stored on removable storage such as a CD-ROM disc. Based on the limitations or the GPS navigation device and the user's preference and requirements, some or all of the map data on the CD-ROMs can be placed on the GPS navigation device through either the interface port, or by placing the desired map data on a flash memory card and inserting the card into the GPS navigation device. Additionally, a laptop computer or other computing device can be used in conjunction with the maps to plan routes, taking into account variables such as desired areas of interest and preferred roads. Once the routes are planned the trip data is downloaded to the GPS navigation device in the manner specified above.

When used in a motor vehicle and loaded with the appropriate map data, a GPS navigation device such as the StreetPilot III can provide real-time driving instructions to the motor vehicle operator en-route to a destination. Typically, at the outset of the trip or while in transit, the motor vehicle operator enters the desired destination, or chooses from among the preplanned routes that were downloaded to the device. The GPS navigation device periodically checks the position of the motor vehicle through the use of GPS sensors located in the device or vehicle. The position is correlated with positions on the downloaded map and real-time driving directions are relayed to the motor-vehicle operator. In the event the motor vehicle deviates from the planned path, the GPS navigation device can recompute a new path to the destination based on the current position of the vehicle and the available routes as indicated on the map.

There are many ways to compute a route to a destination. The most common method falls under the category of distance based shortest path routing. In distance based shortest path routing, a route is selected based on an algorithm that uses absolute distance as a comparison metric. This path may not be the fastest path however. Since speed limits vary from path to path, it may take more time for a vehicle to reach its destination depending on the path taken. To provide a better overall route choice, some advanced geographic information system (GIS) databases, or maps, comprise information such as speed limits. This additional information can be used in conjunction with absolute distance to select the shortest route to the destination based on the overall estimated delay.

The GPS navigation devices described above have no way to take into account current traffic conditions such as congestion, closed roads, accidents, and the like, in planning routes. Thus, while an uncongested alternate route might be available en-route to a destination, it is likely that the GPS navigation device will plan a route and issue instruction that take the motor vehicle into the heart of a traffic jam merely because that route appears to be the shortest or fastest on a map. In order to try to avoid areas of congestion and thus minimize drive time, the motor vehicle operator must rely on radio reports, which may be incomplete or delayed in time, or rely on an intuitive feel for traffic patterns given the area and time of day of travel, and adjust their route accordingly. Often by the time the motor vehicle operator has realized that they are going to hit a pocket of traffic congestion or other undesirable traffic condition, it is too late to take an alternate route and the motor vehicle and its occupants must simply sit in the traffic, wasting valuable travel time, as well as fuel.

Various systems have been devised to communicate traffic conditions to motor vehicle operators in order to better avoid the involved regions or roads and plan the trip accordingly. All of these systems however rely at least in part on external communication networks, in addition to radio news reports, central databases, roadside sensors, and environmental sensors to sense and share traffic information. One standard for roadside to vehicle communications is IEEE 1455. U.S. Pat. No. 6,252,544 describes a mobile communication device for outputting environmental statuses, such as inclement weather, traffic jams, construction, radar traps, and the like to motor vehicle operators. The mobile communication device makes use, at least in part, of various vehicle sensors radar detectors, safety warning systems, optical systems, roadside communication systems, remote databases, and the like to transmit and receive environmental events and notify the motor vehicle operator of those events in advance. Another system described in U.S. Pat. No. 5,732,383 describes a method to estimate traffic conditions based on cell phone use activity. These and other systems have the disadvantage of requiring external traffic reporting systems and a variety of sensors and communication systems to accurately report conditions.

U.S. Pat. No. 6,101,443 describes a system to compute a detour route in response to road traffic information. This system also relies on an external road traffic information reporting system. Other systems such as U.S. Pat. No. 5,610,821 attempt to assign routes to vehicles to maintain optimal traffic system stability. But these systems depend upon, at least in part, roadside antennas and centralized databases and computers to globally compute routes for all the vehicles in the network. U.S. Pat. No. 4,350,970 also describes a method for traffic management comprising a routing and information system for motor vehicle traffic that uses stationary routing stations each located in the vicinity of the roadway which transmit route information.

Thus, a need presently exists for an enhanced mobile communication device capable of operating in fast moving and high density networks such as a motor vehicle transportation network. Further, a need presently exists for an enhanced vehicle navigation system and transportation network that can communicate traffic conditions and traffic congestion information among the vehicles in the transportation network without the need for external antennas, external radios, and other roadside and centralized devices of the prior art. A need also exits for a system and method for analyzing traffic congestion information and plan routes through a transportation network.

SUMMARY

By way of introduction, the preferred embodiments provide an enhance mobile communication device. A transportation application of the mobile communication device is also provided. The mobile communication device communicates directly with other mobile communication devices in an ad-hoc mode over a wireless medium. The mobile communication device comprises an application that constructs a packet of digital data. A connection means responsive to the application connects to the wireless medium. A transmitting means responsive to the connection means transmits the packet of digital data over the wireless medium. A receiving means senses activity in the wireless medium and also receives packets of digital data from other mobile communication devices. The application constructs the packet with a limited and variable length such that when transmitted the probability that the other mobile communication devices receive the packet of digital data is increased. The application further increases the probability of reception by causing the connection means and transmitting means to attempt to transmit the packet of digital data a multiple and variable number of times. The multiple and variable number of times varies according to activity in the wireless medium. The application also causes the mobile communication device to transmit the packet of digital data periodically, and to vary the period of transmission according to activity in the wireless medium. In one embodiment the connection means, transmitting means, and receiving means operate according to an IEEE 802.11 standard.

In a transportation application, the packet of digital data constructed by the application means comprises traffic congestion update data. The mobile communication device further includes a traffic database, a map database, and a mobility module, such as a global positioning system receiver, for determining the position and speed of the device. A transportation network comprises a plurality of routes and a plurality of vehicles, each comprising the mobile communication device, and each traversing the transportation network from a current position to a destination. Each mobile communication device transmits and receives traffic congestion update data as they pass within communication range of each other. The traffic congestion update data, the traffic database, and the map database is analyzed local to each vehicle. Traffic congestion update data is stored in the traffic database. The application further comprises a vehicle navigation application. The vehicle navigation application predicts traffic flows and estimates traffic patterns by analyzing the traffic congestion update data and the traffic database, along with the map database. The vehicle navigation application computes routes for the vehicle from its source or current position to a destination in light of the traffic congestion information, the predicted traffic flows, and the estimated traffic patterns.

The foregoing paragraphs have been provided by way of general introduction, and they should not be used to narrow the scope of the following claims. The preferred embodiments will now be described with reference to the attached drawings.

DETAILED DESCRIPTION OF THE PRESENTLY PREFERRED EMBODIMENTS

Figure 1:
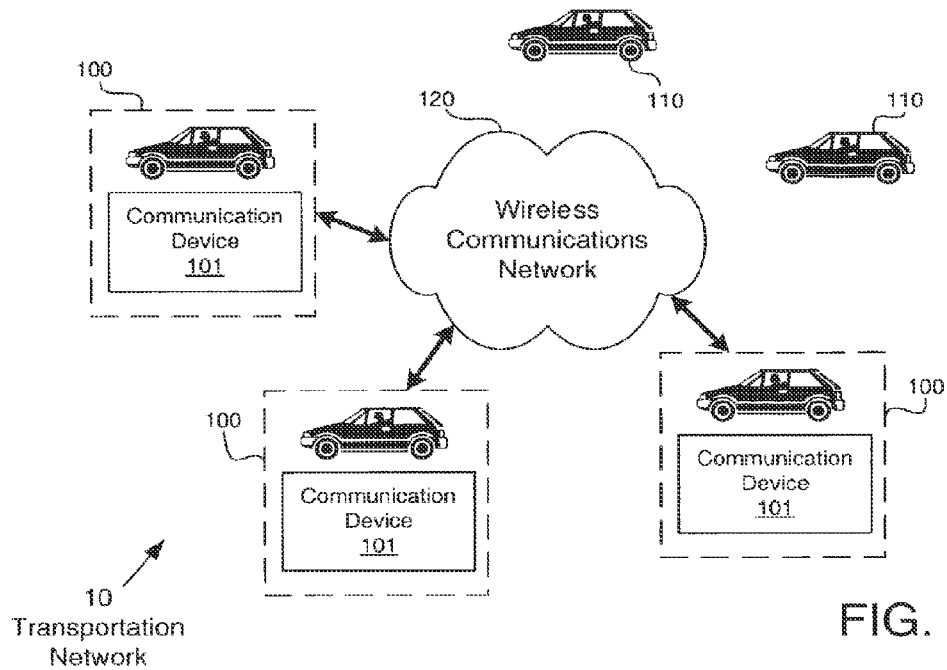
FIG. 1 is an enhanced transportation network.

FIG. 1 shows an enhanced transportation network 10. The transportation network comprises a plurality of mobile communication device equipped vehicles 100 and optionally a plurality of vehicles not equipped with communication devices 110. In FIG. 1 vehicles 100 and 110 are automobiles and are traversing a network of roadways in the transportation network 10. The roadways may be city streets, rural streets, interstate highways, or any other network of roads for which automobiles are adapted for travel. The automobiles may be any other type of vehicle capable of traveling on roadways. It is understood when using the term "equipped vehicle" that reference is being specifically made to the mobile communication device traveling with the vehicle, and not to the vehicle, type of vehicle, or mode of transportation employed by the vehicle. As such, a vehicle may include not only automobiles, but motorcycles, bicycles, human beings, animals, aircraft, water vehicles, and any other system capable of transporting people and goods.

The equipped vehicles 100 have access to a wireless communication network 120. The communication network 120 allows direct vehicle-to-vehicle communication. As used herein, direct vehicle-to-vehicle communication, or direct communication, is intended broadly to encompass communication between at least two vehicles or communication devices whereby communications sent from one vehicle or communication device are received directly by another vehicle or communication device without the use of repeaters, base stations, up-converters, down-converters, intermediary amplifiers, auxiliary antennas, auxiliary communication systems, and the like. Preferably the network is a wireless network such as an IEEE 802.11 or Wi-Fi (Wireless Fidelity) communication network operating in ad-hoc mode, but may be other types of wireless networks capable of direct vehicle-to-vehicle communications, and capable of transmitting and receiving digital data. The non-equipped vehicles 110 do not have access to the communication network 120 and thus cannot communicate with any of the equipped vehicles 100.

Figure 2:
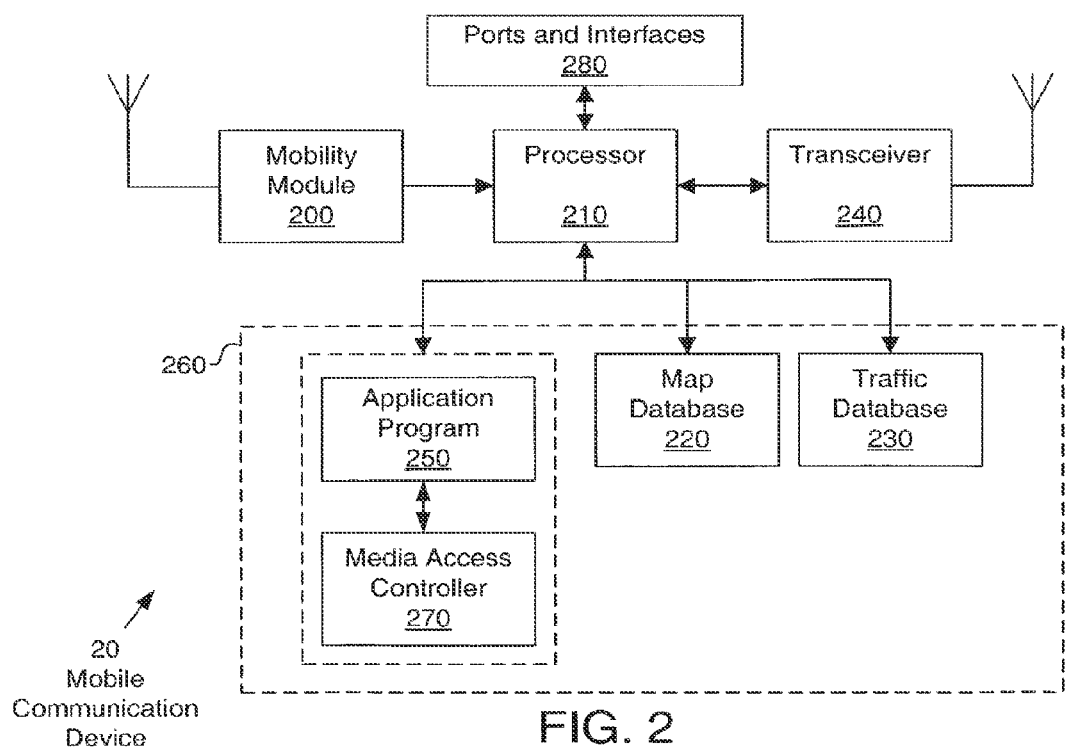
FIG. 2 is a mobile communication device.

Each of the equipped vehicles 100 in the transportation network 10 is outfitted with a mobile communication device 101. FIG. 2 shows in greater detail a mobile communication device 20 local to the equipped vehicles 100. It is not important how the mobile communication device 20 is installed in each vehicle, only that it travels with the vehicle. For example, the mobile communication device 20 may be installed during the manufacture of the vehicle, or it may be a subsystem component of another system within the vehicle, or it may be any combination of vehicle subsystems and external devices. Alternatively, the mobile communication device 20 may be a self contained external unit that is placed in the vehicle after the vehicle manufacture, such as is common with current GPS mapping systems such as those made by Garmin. Still another possibility is that the mobile communication device 20 is a portable handheld unit that is not permanently affixed to a point in or around the vehicle but is rather temporarily brought into the vehicle when needed. Or, the mobile communication device may comprise two or more sub-system devices in communication with each other via an interface such as serial, parallel, optical, wireless, and the like.

The mobile communication device 20 comprises a processor 210, a wireless transceiver 240 in communication with the processor 210, and a memory 260 in communication with the processor 210. The memory comprises executable code such that when executed on the processor causes the processor to execute an application program 250 and a media access controller (MAC) 270, both in communication with each other. The mobile communication device 20 may optionally include a mobility module 200 in communication with the processor.

The media access control protocol 270 is a set of procedures to allow the effective use of a shared medium, such as the wireless medium 120. MAC protocols may include the ability to perform per-packet transmitter power control, which can increase the carrying capacity of a packet radio. Additionally, the MAC may also comprise hardware as part of the transceiver 240 or processor 210, whereby the MAC 270 communicates signals via the processor 210 to the transceiver 240.

The application program 250 may comprise many types of applications, such as the vehicle navigation application which will be discussed below. The memory 260 may also comprise additional components such as a map database 220 and a traffic database 230, both of which may be accessed by the application program 250. Other examples of application programs are web browsing applications, e-mail applications, audio entertainment applications, video entertainments applications, vehicle-to-vehicle vocal communication applications, safety warning applications, and location-based information applications.

Although the components of mobile communication device 20 are shown as separate and distinct components there may in fact be a greater or lesser number of components from a hierarchical standpoint, as long as the function relationships between components are maintained. For example, the map database 220 and the traffic database 230 may reside on the same physical device, although functionally there are two distinct databases. Or the contents of memory 260 may be distributed among multiple physical memories.

The mobility module 200, may comprise a GPS position sensor or receiver capable of determining the position and speed of the mobile communication device 20. As used here, GPS position sensors also include more than one type of GPS position sensor and GPS position sensors coupled with electronics to condition and output the signals received by the GPS position sensor or sensors, as well as to improve the accuracy of the reading from the sensors or sensor 200. Such GPS position sensors are widely available. If the mobility module does not output speed directly, the processor 210 in concert with the mobility module 200 provides a means to determine the speed of the vehicle through multiple samples of time and position. Other means may be used to determine speed such as by sampling the speed sensor which is used to indicate the speed on the vehicle's speedometer. While this may provide an extremely accurate reading of speed, it is not necessary to introduce an additional sensor into the system and may in fact be impossible for portable non-permanent GPS navigation devices 20 temporarily located within the vehicle. Current GPS receivers can provide location coordinates with less than 30 meters accuracy. Thus, the speed of the mobile communication device, or vehicle, can be very accurately determined since GPS receivers typically refresh their position information every 1 second.

The processor 210 may be any modern microprocessor or microcontroller capable of high speed data processing. The processor 210 can also be a custom designed processor. Many modern GPS mapping systems such as those made by Garmin and others contain microprocessors that can be suitably adapted for the mobile communication device 20. The map database 220, traffic database 230, application program 250, and MAC 270 may reside in a physically separate memory from the processor 210, or in an integrated memory, such as a memory integrated with the processor 210. The memory may take the form of SRAM, DRAM, FLASH RAM, magnetic storage, optical storage and many other types of modern storage, and the memory either in part or in whole may be fixed or removable. It is desirable, but not necessary, that at least a portion of the memory be non-volatile such that when power is removed from the mobile communication device 20 at least some of the contents in the memory remain intact.

The wireless transceiver 240 preferably comprises a wireless transmitter and wireless receiver operating according to the IEEE 802.11 standard, and preferably operating in an ad-hoc mode. As mentioned above, the transceiver 240 may also include additional components for ensuring reliable MAC protocol operation in accordance with the MAC code 270 being executed by processor 210.

The mobile communication device 20 may include additional elements similar to those of GPS mapping devices discussed above. Some of these features include but are not limited to data ports, such as USB, serial, and IEEE 1394 ports, to upload and download maps and data and program code to and from external computing devices, removable data cards, external or internal speakers and display units, user interface units such as keyboards, switches, touch screens, and voice recognition units, and additional fixed and removable storage devices. Additionally, the mobile communication device may include an IEEE 802.15 port, also known as Bluetooth. Via a wireless personal area network, the Bluetooth port allows the mobile communication device to wirelessly communicate with other Bluetooth devices and systems in the vehicle. Generally, the abovementioned additional elements are in communication with processor 210 as indicated by the Ports and Interfaces module 280 of FIG. 2.

If the application program 250 is a vehicle navigation application, the mobile communication device 20 local to each vehicle 100 also includes a map database 220 and a traffic database 230, both stored in memory 260. The traffic database comprises traffic congestion information received from other vehicles in the transportation network. Briefly, the traffic database is analyzed with the map database for estimating traffic flows, predicting traffic patterns, and determining routes. The details of the traffic congestion information, as well as the analysis and of the traffic database, will be described below.

The map database 220 may include city, town, highway and local road maps as well as detailed maps with business and residential streets. Additionally the map database 20 may include points of interest such as food and drink, lodging, attractions, entertainment, shopping, emergency services, and the like. Maps are commonly available on CD-ROM and placed on the mobile communication device 20 via a wired or wireless interface with an external device capable of reading the CD-ROM and sending the map data to the device 20. Maps may also be placed on removable memory such as FLASH RAM and transferred to the device 20 via a port or interface 280. Garmin MapSource is an example of CD-ROM maps that may be used with the mobile communication device 20.

In a transportation application for vehicle navigation, equipped vehicle 100 and optionally non-equipped vehicles 110 are traversing roads in the transportation network 10 from their current position to a destination. Briefly, as equipped vehicles pass within range of each other, they transmit and receive traffic congestion information, or traffic databases, either in part or in whole. The vehicles communicate directly with each other. The traffic congestion information is analyzed along with the map database and traffic database, and routes are computed local to each equipped vehicle from a source or current position to a destination according to the analysis. Local to each vehicle, traffic congestion information is periodically transmitted according to an analysis of the received traffic congestion information, and an analysis of the traffic database and map database.

Figure 3:
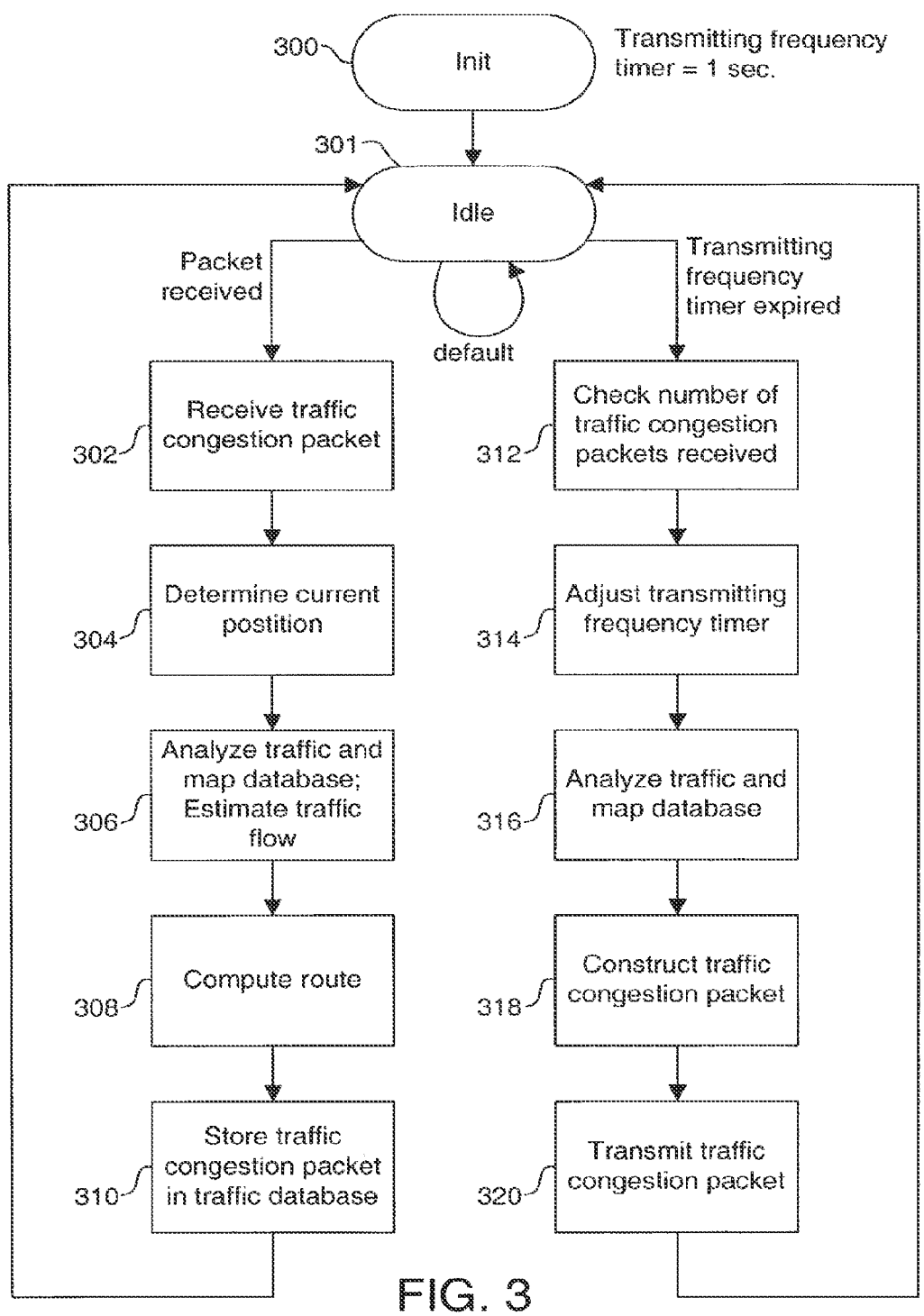
FIG. 3 is a transportation application of the mobile communication device.

In the application, with reference to FIG. 3, after an initialization step 300, each mobile communication device local to each equipped vehicle is idle 301, remaining there until receiving traffic congestion information 302-310, or transmitting traffic congestion information 312-320.

After receiving a packet of data comprising traffic congestion information 302, the details of which will be described below, the current position and speed is determined 304. Next, the traffic congestion packet, the traffic database, the map database, and the current position is analyzed, and traffic flow is estimated 306. Based on the analysis and estimates, a route is computed 308 from the current position determined in step 304 to a destination. Also, the traffic congestion packet is stored 310 according to the analysis in step 306.

Returning back to the initialization step 300, a transmitting frequency timer is initialized, followed by the idle step 301. The timer controls how frequently traffic congestion information is transmitted. The timer is initialized such that attempts to transmit will be made every one second. From idle 301, once the transmitting frequency timer has elapsed or expired, the number of traffic congestion packets received per second is checked 312. Next, the transmitting frequency timer is adjusted 314 according to step 312. The details of the adjustment will be discussed below. After that, the traffic and map database is analyzed 316, a traffic congestion packet is constructed 318, and the traffic congestion packet is transmitted 320.

There are two packet formats for traffic congestion packets. A beacon service table (BST) comprises real-time and historical data about the current vehicle. A vehicle service table (VST) comprises the same fields as the BST, and additionally comprises data with information received from other vehicles. Some or all of the additional data may reside in the traffic database 230. The BST and VST, and the data comprising them, are also referred to herein as traffic congestion update data, traffic information, traffic congestion update information, or traffic congestion information as the contents comprise information relevant to the traffic congestion and traffic flows.

BSTs and VSTs are transmitted periodically, as mentioned briefly above with reference to steps 300, 301, 312, and 314. The period of transmission is variable, and varies according to the density of surrounding vehicles. By default, a vehicle transmits a BST at a transmitting frequency of 1 BST every one second. The vehicle varies its transmitting frequency period as it receives BSTs from surrounding vehicles. If the vehicle receives more than 10 BSTs per second it reduces its transmission frequency by half, for example, one BST every 2 seconds. The transmission frequency is set according to a Fibonacci series, that is the transmission frequency is set to 1 BST every 3, 5, 8, 13, 21, 34, . . . seconds for 30, 40, 50, 60, 70, 80, . . . BSTs received per second.

The stability of the wireless network is maintained by adjusting the transmission frequency as specified above. Bandwidth saturation occurs in 802.11 networks when the utilization of the medium exceeds approximately 40% to 50%. Saturation is the point where the medium is being optimally utilized, but also where even the slightest increase of wireless traffic in the network forces the network into an unstable state. The adaptive BST transmitting frequency method above ensures stable network operation, at a level somewhat below saturation, while providing a buffer for increased or sudden wireless network traffic.

The structure of the BST and VST are shown below in standard ANSI C format. The list attached to both a BST and VST packet comprises vehicle route table (VRT) entries. The VRT entries comprise traffic flow information on a per segment basis. Referring below, a BST comprises the VST structure plus one entry of the VRT structure as part of the res_vrt_lptr list. A VST is identical to the BST but includes additional VRT entries as part of the res_vrt_lptr list. Source-encoding techniques may be used to substantially reduce the size of a BST and VST. The following definitions for BST and VST provide one possible implementation solution.

```
typedef struct
{
    char    vehicle_id[16];  /* Vehicle name                    */
    double  begin_coo_x;     /* Segment beginning x coordinate  */
    double  begin_coo_y;     /* Segment beginning y coordinate  */
    double  end_coo_x;       /* Segment ending x coordinate     */
    double  end_coo_y;       /* Segment ending y coordinate     */
    int     weight;          /* Outcome of aggregation          */
```

```
    char    vehicle_dir[4];  /* Vehicle direction               */
    double  avg_speed;       /* Average vehicle speed           */
    double  max_speed;       /* Maximum vehicle speed           */
    double  min_speed;       /* Minimum vehicle speed           */
    double  sample_period;   /* Sampling period in seconds      */
    double  timestamp;       /* Time when this entry was created */
} VRT;
typedef struct
{
    int     app_id;          /* Application identifier (RO)     */
    char    vehicle_id[16];  /* Vehicle name                    */
    double  vehicle_orig_x;  /* Vehicle origin x coordinate     */
    double  vehicle_orig_y;  /* Vehicle origin y coordinate     */
    double  vehicle_dest_x;  /* Vehicle destination x coordinate */
    double  vehicle_dest_y;  /* Vehicle destination y coordinate */
    double  GPS_lat;         /* GPS latitude                    */
    double  GPS_long;        /* GPS longitude                   */
    double  GPS_alt;         /* GPS altitude                    */
    char    GPS_dir[4];      /* GPS vehicle direction           */
    double  GPS_speed;       /* GPS vehicle speed               */
    double  signature;       /* Data integrity signature        */
    List*   res_vrt_lptr;    /* List with selected VRT tuplees  */
} VST;
```

The BST is used as a beacon to announce to other vehicles the state of the transmitting vehicle and to share basic position and route information with other vehicles. The BST, as a beacon, should not be confused with what is normally thought of as an 802.11 beacon. 802.11 beacons are merely used for radio synchronization purposes, and do not comprise the information of a BST.

The BST is a packet that is transmitted regularly and comprises local information. The BST, or beacon information, changes as the vehicle changes position in the transportation network. The VST is used for more advanced dialogues between vehicles and includes information according to the analysis step 316. For example, when a local vehicle receives a BST from a remote vehicle, the BST may comprise information about a trajectory that coincides or partially overlaps with the local vehicle's trajectory or destination. The application programs in the local and remote vehicles then construct VSTs comprising relevant traffic data (316, 318), and cause the communication of the VSTs (320).

Depending on the resolution and timing of the received packets there may be packets comprising information with substantially identical time stamps but different positions. Referring to the VRT structure above, a time stamp is communicated as part of as the variable "timestamp". Upon an analysis (306, 316) these entries are identified as distinct equipped vehicle 100. Another method to identify distinct equipped vehicles 100 within the transportation network 10 is to assign each vehicle a unique ID and transmit that ID along with other traffic information, as is indicated by the vehicle_id[16] field above. Duplicate entries are not stored in the traffic database in step 310, thus whether a received packet is stored is based at least in part according to the analysis in step 306.

The traffic database 230 and map database 220 is analyzed to determine current and historical traffic flows (306). Further, future traffic conditions are estimated using traffic prediction and traffic estimation techniques. Traffic prediction uses current traffic data to predict the speed on a segment or road that that is likely part of the vehicle's route. Traffic estimation utilizes current data as well as historical information to more accurately calculate the speed of the vehicle upon reaching a certain segment of the freeway in the future. Maximum likelihood estimation is used for traffic prediction and estimation. Maximum likelihood estimation is known by those with ordinary skill in the art. Other known methods that may be used with the present invention are sequential estimation and prediction using Kalman filters, and use of an autoregressive process to predict deviations.

The application program 250 associates BST and VST information stored in the traffic database 230 with roads and routes in the map database 220, and further performs additional computations for traffic flow estimation and prediction (306). For example, a high concentration of slow moving vehicles concentrated around the same time period on the same road or route indicates traffic congestion on that road or route. Additionally, traffic congestion may be present if the average speed of the vehicles traveling on a particular route or road is well below the speed limit indicated in the map database, or the historical average speed limit for that time period. Conversely, if the average speed is higher than expected, the road may be relatively free moving. High traffic concentration but free traffic flow may be present if there are more vehicles than historically expected for the expected time of travel on the road or route of interest, and if the average speed of those vehicles is at or above the speed limit or average speed for that route or road during the estimated time of travel.

Further, the application program may comprise a safety warning application, such as a collision warning application, that identifies sudden traffic flow changes that may be due to accidents or other dangerous traffic conditions ahead of the vehicle. The application program at the local vehicle identifies dangerous traffic conditions if remote vehicles ahead of the local vehicle have an average speed of less then 10 mph (speed_remote), and if the difference between the local vehicle speed (speed_local) and the average remote vehicle speeds is at least 50% of the local vehicle's speed, that is, (speed_local−speed_remote)/speed_local>0.5, and speed_remote<10. The application may also issue a safety warning if a vehicle is on a road but has a speed of zero, that is it is not moving. These warning can be transmitted to other vehicles according to steps 316, 318, and 320. Those skilled in the art will recognize that many other traffic flows can be computed from the traffic database 230 in conjunction with the map database 220 local to each equipped vehicle 100. The analyses above are included merely as examples of what can be achieved and are not intended to limit the scope of the invention in any manner or form.

As will be discussed in greater detail below, the application program may include a vehicle navigation application for route planning. The vehicle navigation application computes a route (308) for the equipped vehicle from a source, or current position, to a destination according to the analysis of the databases. The current position is periodically determined (304) by sampling the output of the mobility module 200.

The route and other information can be communicated to the operator of an equipped vehicle 100 via an audible or visual interface 280 of the mobile communication device 20. A visual display may, for example, show a map indicating the local area of interest with a graphical overlay of current traffic conditions. Colors may indicate congestion information. For example, blue may indicate that a road is clear, orange might indicate the there is moderate traffic on the road but little congestion, and red might indicate serious traffic congestion or a safety warning. Those skilled in the art will appreciate that there are many ways to communicate the results of the various calculations.

Traffic congestion information exchanges, traffic database exchanges, and the computations discussed above can be performed while an equipped vehicle is moving or stationary. For example, in one scenario an equipped vehicle 100 may be located in a garage and exchanging congestion information with other moving equipped vehicles 100 as they pass within communication range of the garaged equipped vehicle. Additionally, the traffic database 230 could be uploaded to a remote or fixed computing device separate from the equipped vehicle and traffic flow estimation and prediction, as well as route planning, can be executed off-line of the mobile communication device and then downloaded back to the mobile communication device local to the equipped vehicle 100. The motor vehicle operator can then select various destinations at the outset of a trip, with the routes pre-computed, and driving directions relayed to the driver while en-route to the destination. Route adjustments are optionally made en-route to the destination as will be described below.

Route Planning

The term "route planning" as used herein is defined broadly to encompass a method of finding a path from a current position to a destination through the networks of roads in the transportation network 10 as indicated by the map database 220.

The application program 250 comprising a vehicle navigation application calculates routes to a destination for the equipped vehicle 100. Briefly, the application calculates a first route from the mobile communication device's source, or current position, to a destination, through segments, or roads, of the transportation network as indicated by the map database. The application program may compute alternate routes through the transportation network as the vehicle changes positions and moves through the network, as traffic databases are created and exchanged among equipped vehicles, and as traffic flows evolve.

There are many methods for calculating routes from a source to a destination given a network of segments or roads. The most commonly used method, as mentioned briefly above, is shortest path routing. Almost all routing algorithms are based on a shortest path tree (SPT) approach. This algorithm is based on greed, that is it opts for the best possible route whenever a route decision has to be made. This class of algorithms is also known as breadth first search. Another class of algorithms know as depth first search may also be used. In its simplest form, shortest path routing based on distance can be used by vehicles to calculate the shortest route to a destination.

Using distance alone as the comparison metric for determining routes does not, however, exploit useful information available in the map database and traffic database such as segment speed limits, segment congestion, and the like. By using a shortest path algorithm based on dynamically changing and time varying segment cost functions, intelligent route decisions based on the traffic databases, traffic flow prediction and estimation results, and map database data can be made in a real-time manner. Other types of algorithms, such as genetic algorithms, dynamic programming, and various adaptations of shortest path algorithms, may also be used alone or in combination.

Many of the algorithms mentioned above are used daily to compute routes from a source to a destination for a vehicle traveling a network of roads, and for provide driving direction. Examples of such algorithms are used at on-line Internet mapping services such as Mapquest, Yahoo!'s Maps, Vicinity Corporation's Mapblast, and Microsoft's Expedia. Other examples of algorithms in use can be found implemented on GPS mapping devices such as the Garmin StreetPilot III and the Garmin series of MapSource CD-ROMs. It is noted, however, that none of these services and products are able to provide primary or alternate routes based on real time and predicted traffic flows through the map of interest. The best results they offer are based on route length and segment speeds.

A weighted map is a map wherein each road, or segment representing the intersection of roads, in the map is assigned a numerical weight, or cost. The weight assigned to each segment is a function of the vehicle speed limit on the road. In distance-based shortest routing, a path from a source to a destination is computed using only the length of the road. In delay-based routing the ratio of length over speed is calculated for each segment and used as the cost function in calculating the best possible route from source to destination. Variations on this allow a user to specify that certain roads be selected for travel no matter what the weight and the algorithm.

In one embodiment, the weights for each road or segment are a cost function of the vehicle speed limit on the road, the estimated traffic density on the road for the estimated time of travel on the road, and the estimated average speed of the vehicles on the road for the estimated time of travel on the road. Additional variables can be used in the cost function such as maximum and minimum speeds and traffic densities, standard deviations of densities and speeds, and the results of many other statistical analyses.

By applying more sophisticated cost functions, which are in part a function of the data in the traffic database 230, more intelligent, alternate routes from the current position of the vehicle to the destination can be discovered and relayed to the driver of the vehicle. These routes may be computed based not only on what the traffic conditions are at the current time of travel but also on what the traffic conditions will be on roads of interest later in time when the vehicle approaches those roads. Additionally, because the traffic database 230 is constantly updated throughout travel, en-rout to the destination, the analysis of the traffic database 230 is periodically performed, and the routing algorithm periodically verifies that the current route from the current position to the destination is still efficient in light of evolving traffic conditions. If it is not, a new alternate route is computed from the current position to the destination and commands relayed to the motor vehicle operator such that pockets of traffic congestion are avoided.

The efficiency and stability of the transportation network is considered when choosing an alternate route over the current route. It is not advantageous to always choose the alternate route. If all drivers are directed on the same alternate route, new areas of traffic congestion may form as a result of efforts to avoid current areas of congestion. This is commonly referred to as the over-shooting effect. One way to avoid instability and undue congestion is to evaluate the end-to-end delay of the alternate route. If the end-to-end delay is one minute or more less than the end-to-end delay of the first, or current route, and if the end-to-end delay of the alternate route is at least ten percent shorter than the first route, then the alternate route is chosen. Additional methods utilizing current and historical traffic patterns, as well as probabilistic models of traffic patterns are used to further reduce the overshooting effect.

If the motor vehicle operator deviates from the selected route, that is the vehicle veers from the current route for which driving directions are being issued, a new route is computed as described above. Many other objectives, in addition to the fastest route from a current position to a destination, can be realized. By way of example, some of the objectives are: the vehicle will avoid areas of traffic congestion, the length of time spent traveling is minimized, the distance traveled is minimized, the vehicle is routed through preferred roads while in transit to the destination, and the vehicle is routed past geographical areas of interest while in transit to the destination.

In addition to the advantages the GPS navigation device 20 bestows on an individual vehicle, the transportation network itself, as a whole, functions in a more efficient manner. While the equipped vehicles may be traversing a path from a current position to a destination that avoids areas of traffic congestion, the dynamic and distributed nature of the traffic data and the computations as described above tend to create a transportation network whereby vehicle traffic is substantially evenly distributed and free flowing. Further, if areas of traffic congestion do occur, the dynamic and temporal recomputation of alternate paths tend to work to disperse the traffic congestion much faster than would normally occur. Accordingly, fuel consumption for individual vehicles, and for all vehicles traversing the transportation network, whether equipped with mobile communication devices or not, tends to be minimized.

Ad-Hoc Application and Media Access

As discussed above, applications utilizing ad-hoc media access controllers, such as an ad-hoc 802.11 home application, are not well suited to high density, high speed applications such as the transportation network application discussed above. An application and media access controller for mobile communication device 20 is described below. The application and media access controller can be used in many different high density and high speed ad-hoc mobile network environments.

Figure 4:
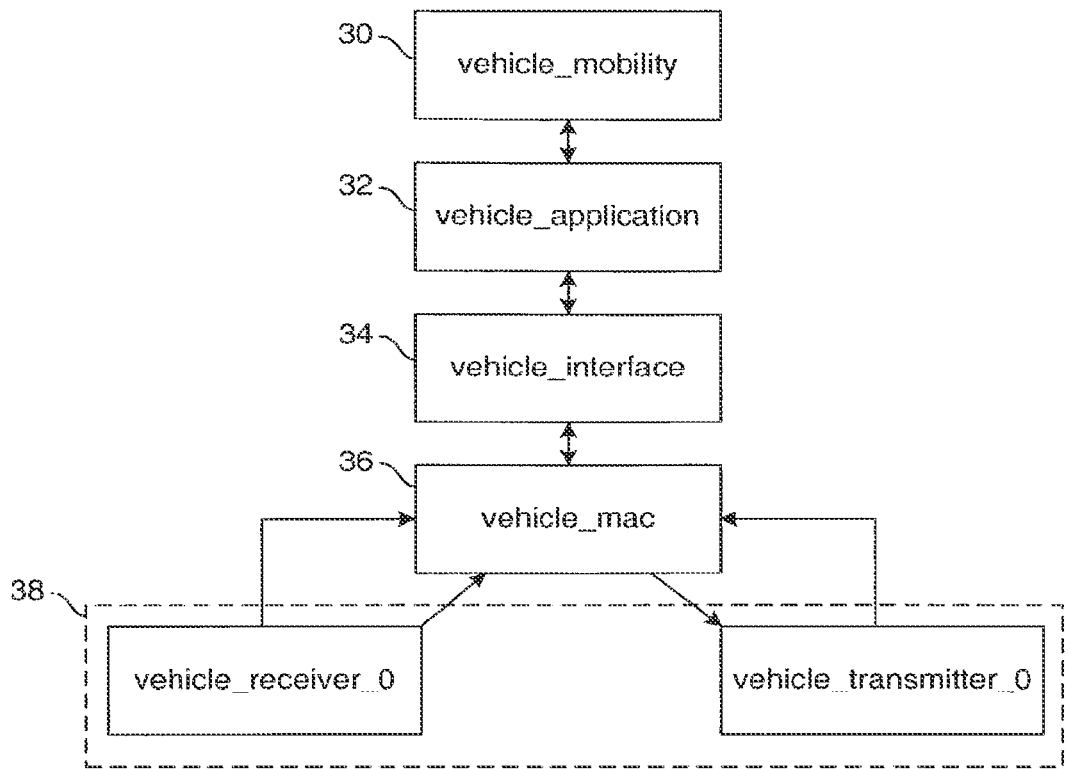
FIG. 4 is the internal network protocol stack for a mobile communication device.

The application and media access controller are implemented in the mobile communication device 20 of FIG. 2, where the application is application 250 and the media access controller is media access controller 270. FIG. 4 shows the internal network protocol stack for the mobile communication device. Referring to FIG. 4 and FIG. 2, vehicle_mobility module 30 corresponds to mobility module 200. The vehicle_mobility module 30 is in communication with vehicle_application module 32, which corresponds to application program 250. A vehicle_mac 36 corresponds to media access controller 270. The vehicle_mac 36 is in communication with a transceiver module 38 comprising two separate modules, vehicle_receiver_0 and vehicle_transmitter_0. Transceiver module 38 corresponds to transceiver 240. Finally, vehicle_interface 34 acts as an interface between vehicle_application 32 and vehicle_mac 36. The vehicle_interface 34 provides miscellaneous interfaces to facilitate communication between the vehicle_application 32 and vehicle_mac 36. The vehicle_interface 34 comprises various software and hardware distributed among mobility module 200, processor 210, memory 260, and transceiver 240 of mobile communication device 20. The vehicle_interface 34 is shown as a separate module in FIG. 4 for hierarchical and simulation purposes and will vary in specific function according the specific software and hardware implementation choices of the mobile communication device of FIG. 2.

The network protocol stack of FIG. 4 also provides a framework for simulating the mobile communication device. Simulation were built and executed using the OPNET (trademark of OPNET Technologies Inc.) network simulator and associated libraries available for the simulator. Briefly, the computer simulation models a transportation network with each of a plurality of vehicle traversing a path from a current position to a first destination in the transportation network. Each vehicle comprises a mobile communication device as modeled by protocol stack of FIG. 4, hereinafter also referred to a the node model. In the simulation, the ad hoc-mode IEEE 802.11 standard for wireless local area networks is simulated.

Figure 5:
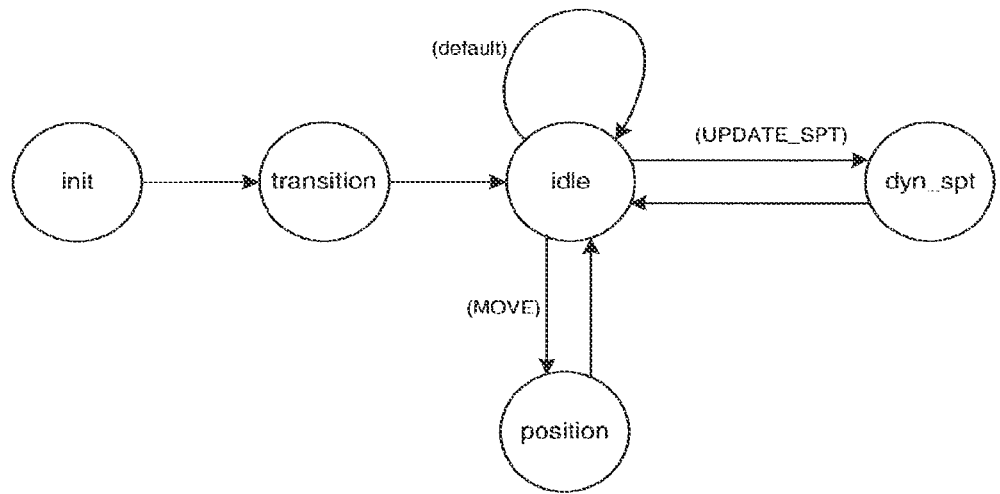
FIG. 5 is a finite state machine for a vehicle mobility module.

The state machine for the simulation of the vehicle_mobility module 30 is shown in FIG. 5. The vehicle_mobility module provides location information to the vehicle_application module 32 in the same manner as described above with reference to the mobility module 200 and application program 250 of the mobile communication device 20 of FIG. 2. The operation of vehicle_mobility module 30 begins at the init state, where all initializations take place. Upon transitioning from the init state to the transition state, the first update to the vehicle's position and speed takes place. At simulation time 0, a state transition occurs from transition to idle. The mobility module remains in the idle mode until an update a position and speed update, at which point a transition from idle to position and back to idle occurs. A per-vehicle timer signals the mobility module to update position and speed information every 0.2 seconds, although this time can be varied. When vehicle_application module 32 signals that a route recalculation or calculation of an alternate route is necessary a transition from idle to dyn_spt and back to idle occurs. Route recalculation was described in detail above. Within the dyn_spt state, algorithms such as the shortest path algorithms described above are implemented based on the expected delay from traffic congestion information received and processed in the vehicle_application module 32. The functions run in the dyn_spt state may be part of the application program 250 of the mobile communication device of FIG. 2 and are shown as part of the mobility module for simulation purposes.

Figure 6:
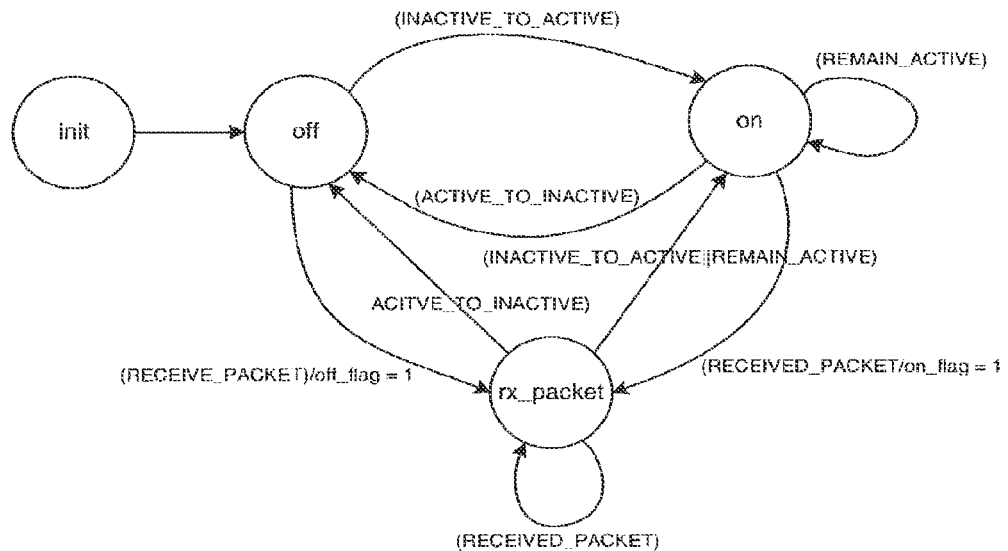
FIG. 6 is a finite state machine for a vehicle application module.

The vehicle_application finite state machine is shown in FIG. 6. The state machine begins at the init state where all one-time initializations occur. After initialization, a transition from the init state to the off state occurs. According to a simulation timer, a transition occurs from the off state to the on sate. In the on state, the application constructs packets of digital data. Packets are constructed of a limited and variable length. The limited and variable length nature of packets significantly increases the probably that other mobile communication devices receive the packet of digital data.

Any increase in the probably of reception is extremely advantageous due to the short window of opportunity to establish data links and transmit data with other fast moving vehicles. Packets of too great a length will not be received completely or error free within the available window. Packets too small in lengths will not carry enough data to communicate position and speed information contained in a BST or VST. The 802.11 standard specifies a maximum packet length of 2304 bytes.

The application module also employs a multiple transmit mechanism for increasing the probably of reception. The multiple transmit mechanism causes the transmission of the packet of digital data a multiple and variable number of times. Packet size and the frequency of multiple transmission vary according to link quality and other statistics available from the MAC and transceiver. Generally, as link quality degrades, smaller packets are transmitted. The quality of the channel or link is determined based on statistics available through the device driver of most commercially available 802.11 radios. Some of the statistics are the received signal strength indicator (RSSI), the signal-to-noise (SNR) ratio, and the signal-to-interference (SIR) ratio. Packet length is regulated according to five different channel quality categories: excellent, very good, good, fair, and poor. When the channel quality is excellent relative to the 802.11 specification there is no maximum packet length limitation, aside from those imposed by the specification. As the channel quality deteriorates from excellent to very good, good, fair, and poor, the maximum length of the packet is reduced so that the bit error rate (BER) is maintained within acceptable range at the receiver.

For good link quality, which is the most frequently occurring class of link, the application module limits the packet length for a single transmission from around 800 bits to 1200 bits, including the header bits necessary for proper 802.11 communications. For multiple transmissions, where the packet is transmitted n number of time, the packet length may optionally be increased, and is limited from around 800+n*400 bits to around 1200+n*400 bits.

The number of duplicate packets transmitted depends in part on the application. For more critical applications such as the safety warning application above, emergency applications, and billing applications, a large number of duplicate packets, such as 5, may be sent. For other applications such as traffic congestion updates and location-based information, a smaller number of duplicate packets, for example up to 3, may be sent.

Simulations indicate that in transportation networks with one to ten equipped vehicles within range of each other, the probability of reception increases by 10 to 20 percent by employing the above detailed methods. Further simulations indicate that in congested scenarios with many more than 10 equipped vehicles, the probability of reception increases on average significantly beyond 20 percent. This increase is even more significant when large and tall objects that obstruct or limit radio communication, as well as different forms of radio interference, are introduced into the communication network.

The application module comprises a transmitting timer that adjusts the frequency at which the mobile communication device attempts to connect to the wireless medium and transmit packets. The period of transmitting timer is variable. This was discussed in some detail with reference to the discussion above on BSTs, VSTs, and transmission frequency. Typically, the timer is initially configured such that an attempt to transmit a packet, or make multiple transmissions of the same packet is made every one second. The transmitting timer utilizes many of the statistics gathered by the media access controller to vary the frequency of transmission attempts. The transmitting timer adjusts the frequency at which it causes the mobile communication device to connect to the wireless medium by way of a simple-increase-multiple-decrease method (SIMD). According to SIMD, the transmitting timer is adjusted up and down as received radio traffic decreases and increases. As detailed above, if the number of packets received by the mobile communication device decreases over time, then the period of the transmitting timer is made less so that the mobile communication device attempts to transmit packets more frequently. If the number of packets received by the mobile communication device increases over time, then the period of the transmitting timer is made greater so that the mobile communication device attempts to transmit packets less frequently.

Turning back to FIG. 6, when a packet is received a transition occurs from either the on state or the off state to the rx_packet state. In the rx_packet state, the packet contents, such as BST and VST data, are extracted, processed, analyzed, and stored as described above.

Figure 7:
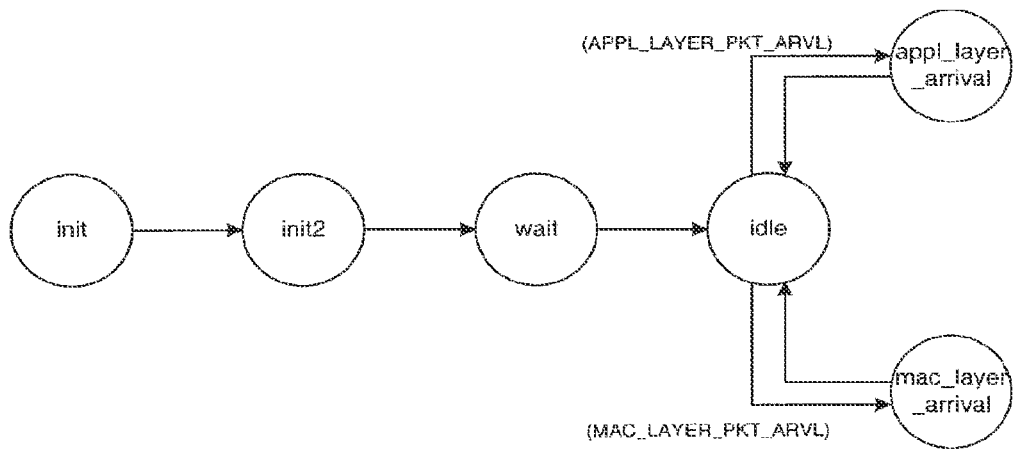
FIG. 7 is a finite state machine for a vehicle interface module.

FIG. 7 shows the vehicle_interface module finite state machine. Initializations are made at the init state, followed by a transition to the init2 state where additional initializations are made. There are two initialization states to avoid synchronization issues in the simulation. A transition is then made to the wait state and then to idle. Upon the arrival of a packet from the application layer, a transition is made to the app_layer_arrival state, the packet is forwarded to the vehicle_mac layer, and the state transitions back to idle. Similarly, upon the arrival of a packet from the vehicle_mac layer, a transition occurs to mac_layer_arrival, the packet is communicated to vehicle_application, and the state transitions back to idle.

Figure 8:
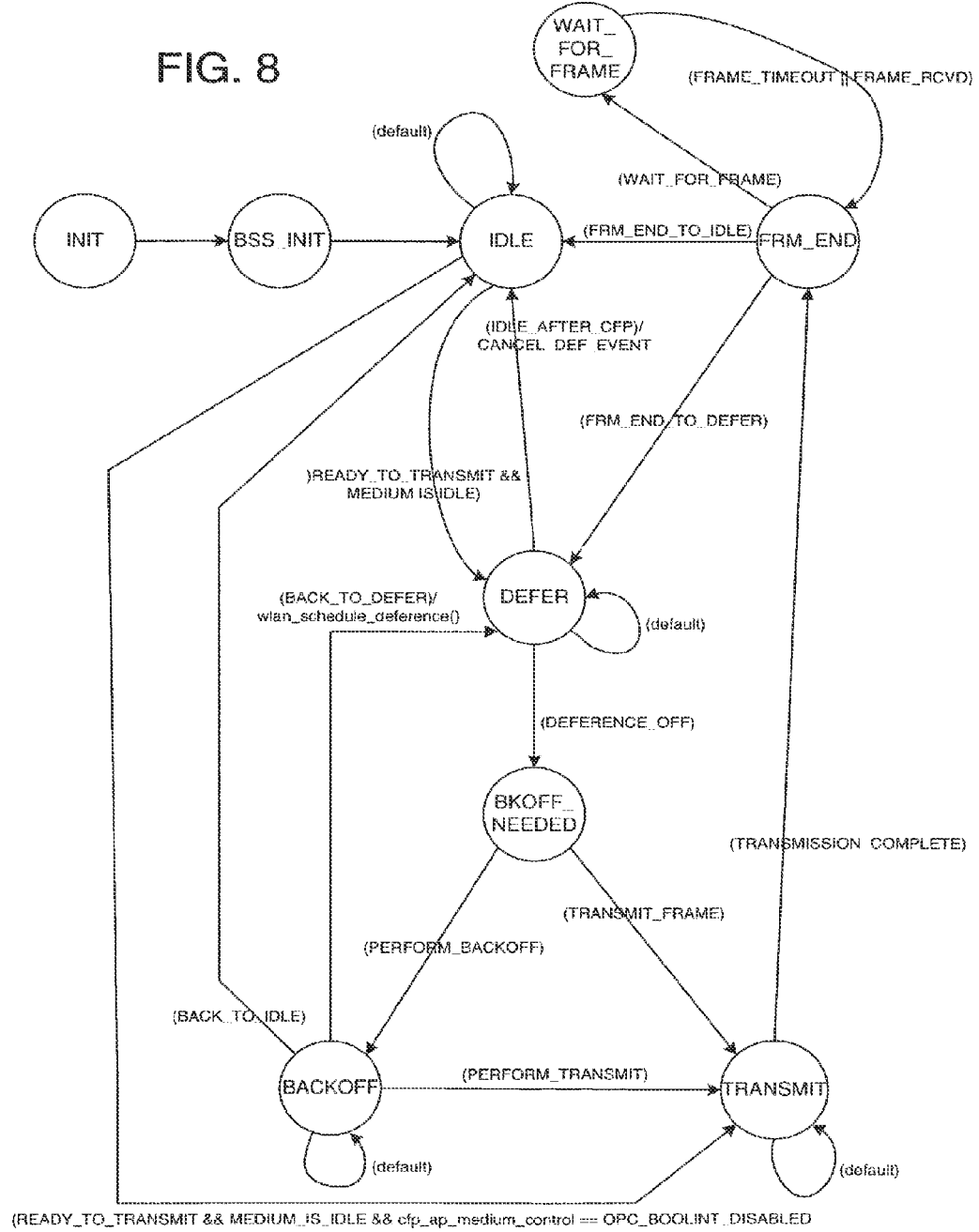
FIG. 8 is a finite state machine for a media access controller.

Referring to FIG. 8, the finite state machine for vehicle_mac 36 is shown. The state machine implements the IEEE 802.11 medium access control protocol and comprises much of the same code as provided in the library of the OPNET simulation tool for simulating an 802.11 ad-hoc MAC. Portions of the source code of the MAC were modified to support ad-hoc broadcast capability, data rate adjustments, packet queuing, and channel activity monitoring.

When the application module generates a packet and the packet is ready to be transmitted, the interface module signals the MAC to assign a broadcast address, as the destination address, to the packet. 802.11 follows different medium access procedures when transmitting a broadcast packet versus a unicast packet. When a packet is broadcasted there is no fragmentation of the packet at the MAC layer. As such, all packet length control functions are managed by the application module, as described above. Additionally, based on a dynamic data rate algorithm, the transmission data rate is adjusted based on link quality as defined in the 802.11 specification. The data rates available for 802.11a, the standard used herein, are 6, 9, 12, 18, 24, 36, 48, and 54 Mbps (megabits per second). The data rates available for 802.11b are 1, 2, 5.5, and 11 Mbps.

In this particular media access controller implementation, at most one packet can be stored in a transmission queue maintained by the MAC. Since the application produces real-time location and speed updates, it is advantageous that the latest packet generated by the application overwrite a previously generated, yet untransmitted, packet. Under heavy network load conditions, whereby it is possible that hundred of vehicles are vying for access to the wireless medium, it is possible that several seconds can pass before a packet is transmitted, further highlighting the importance that the transmitted packet comprise current and relevant data.

Additional enhancements to the media access controller enable the monitoring of low-level radio statistics such as channel activity, which includes information such as RSSI, SNR, and SIR. The media access controller enhancements also include the ability to monitor the number of packets correctly received and forwarded to the application modules. Also, the media access controller module gathers additional information regarding colliding packets, erroneous packets, and noise as received and processed at the transceiver. The dynamic data rate algorithm uses these statistics to modify transmission data rates at the transceiver. The application module, or application program, also accesses these statistics in order to make many of the decisions described above, such as how many times to transmit the packet and how large of a packet to construct.

Referring back to FIG. 8, two initialization states, init and bss_init, provide initialization functions, followed by a transition to the idle state. These states, as well as the following states described all operate in accordance with the IEEE 802.11 standard. If upon monitoring the medium, that is the wireless frequencies comprising the 802.11 ad-hoc network, the medium is determined to be idle, and there is a packet ready to be transmitted, a transition occurs from the idle state to the defer state. The MAC remains in the defer state for on the order of ten to several tens of microseconds, during which time it continues to monitor the medium, and packet transmission is delayed.

Upon exiting the defer state, a transition is made to the bkoff_needed state during which it is determined if a back-off operation is required for avoiding contention for the wireless medium. A back-off operation is required if the medium is determined to be busy, that is there is at least one other communication device contending for or using the medium. A back-off operation is also required if a back-off duration calculated in this state is other than zero. The back-off duration represents a number corresponding to time slots in a contention window, referred to as the contention window interval. 802.11 specifies a contention window with 32 time slots, 0 through 31. The number of slots increases according to a binary exponential approach (32, 64, 128, . . . ) up to 1024 depending on whether collisions occur. The back-off duration is calculated even if the medium is idle during the defer state.

If the medium is busy or the back-off duration is not zero, the state transitions to the backoff state, during which a back-off operation is performed. In the backoff state, a back-off counter is set to the number selected from the contention window interval, and whenever the medium is sensed idle for a period equal to one time slot, the back-off counter is decremented by one. When the back-off counter reaches zero, the MAC may attempt to transmit the packet if the medium is idle. Since the number of back-off time slots are chosen at random, the probability that there will be a collision, or contention for the medium, during the next attempt to access the medium is greatly reduced.

If a back-off operation is not required, a transition is made from bkoff_needed to transmit, during which the packet is transmitted. After transmission, a state transition to form_end is made to indicate a completed transition. The state machine then returns to the idle state. The wait_for_frame state is not used in this implementation. That state is used when fragmenting packets. As discussed above, the application module constructs compact and efficient packets, performing all necessary packet length adjustments before sending the packet to the MAC module.

Exemplary Results

Figure 9:
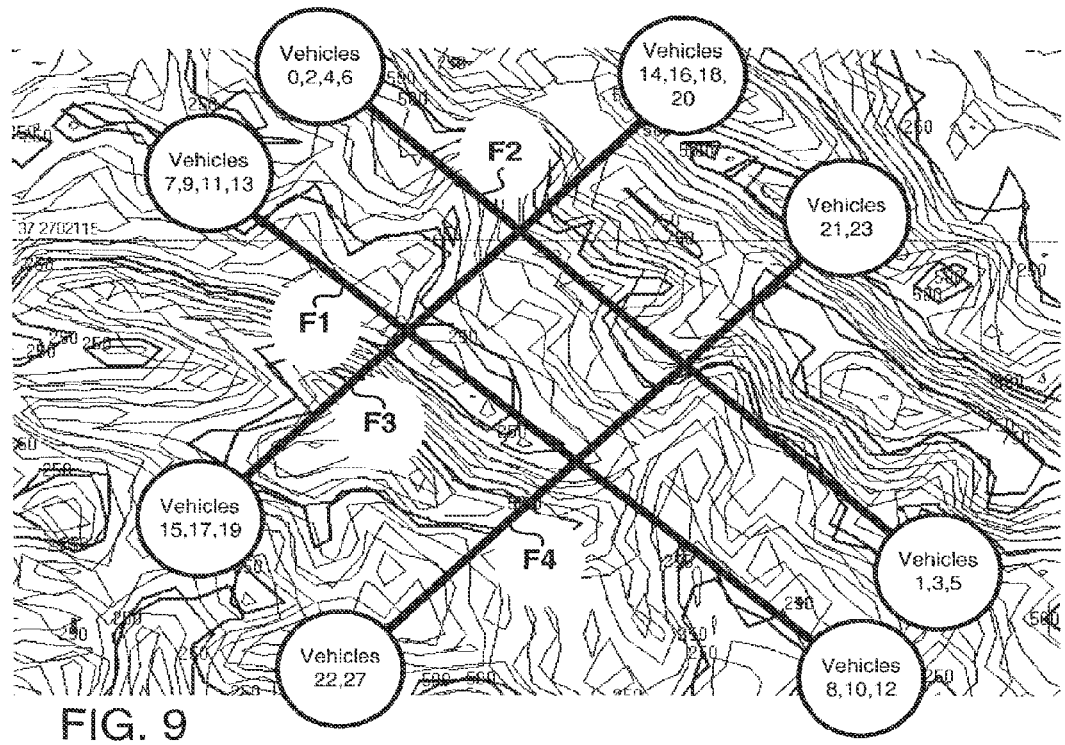
FIG. 9 is a transportation network with twenty five vehicles traversing the network.

Projects, or simulation scenarios, are created using the simulator as shown in FIG. 9. The exemplary project of FIG. 9 comprises four intersecting freeways, F1, F2, F3, and F4, each with end-to-end lengths of approximately fifteen miles. F2 and F4 have speed limits of 65 mph. F1 and F3 have speed limits of 25 mph. There are 25 equipped vehicles in this particular simulation starting off grouped together on the ends of the freeways. The groups of vehicles are, vehicles 7, 9, 11, and 13 on one end of F1 and vehicles 8, 10, and 12 on the opposite end of F1. Vehicles 0, 2, 4, and 6 are on one end of F2 and vehicles 1, 3 and 5 are on the opposite end of F2. Vehicles 14, 16, 18 and 20 are on one end of F3 and vehicle 15, 17, and 19 are on the opposite end of F3. Vehicles 21 and 23 are on one end of F4 and vehicles 22 and 27 are on the opposite end of F4.

Upon commencing the simulation, the vehicle are free to move through the freeways, turn around on the freeways, vary their speeds, and cross over to other freeways independently of other vehicles, on their way to their destinations. In addition to the speed limits imposed on the vehicles by the freeway they are traveling on, the vehicle may also independently adjust their speed according to many distributions such as constant, uniform, random, Gaussian, heavy tail, and the like. Destinations for this scenario are the opposing ends of the freeway that each vehicle started on.

The simulator simulates mobile communication devices traveling with each vehicle, the mobile communication devices broadcasting and receiving traffic congestion update data, analyzing the data as well as link statistics, computing routes, and otherwise operating as described above. The simulation also includes a topographical map of actual digital terrain elevation data. In the example of FIG. 9, the map represents a 20×20 mile area of northern California. The numbers interspersed throughout the map represent contours that define actual terrain elevations. The terrain is important for simulating the propagation of radio waves between vehicles, so accurate path loss calculations can be performed on a vehicle-to-vehicle basis.

Figure 10:
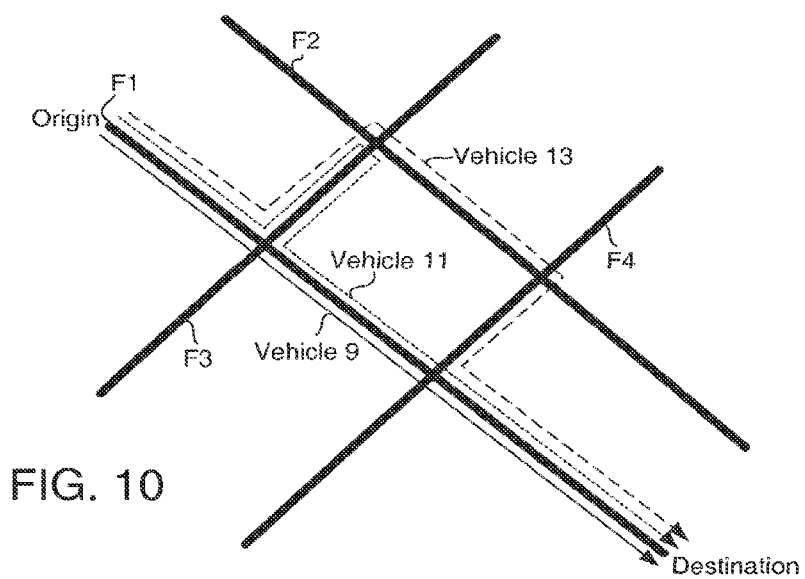
FIG. 10 shows the motion of vehicles 9, 11 and 13 in the transportation network.

FIG. 10 shows the motions of three of the twenty five vehicles along the freeways throughout the simulation. It is noted that the paths were not preset. Rather each vehicle made routing decisions based at least in part on traffic congestion information received from surrounding vehicles. Additionally, it is noted that the wireless medium is accurately modeled and at any time, several vehicles may be contending for access to the medium. While only three vehicles are examined in this simulation, all 25 vehicles are moving simultaneously through the transportation network, with all vehicles making independent routing decisions.

Figure 11:
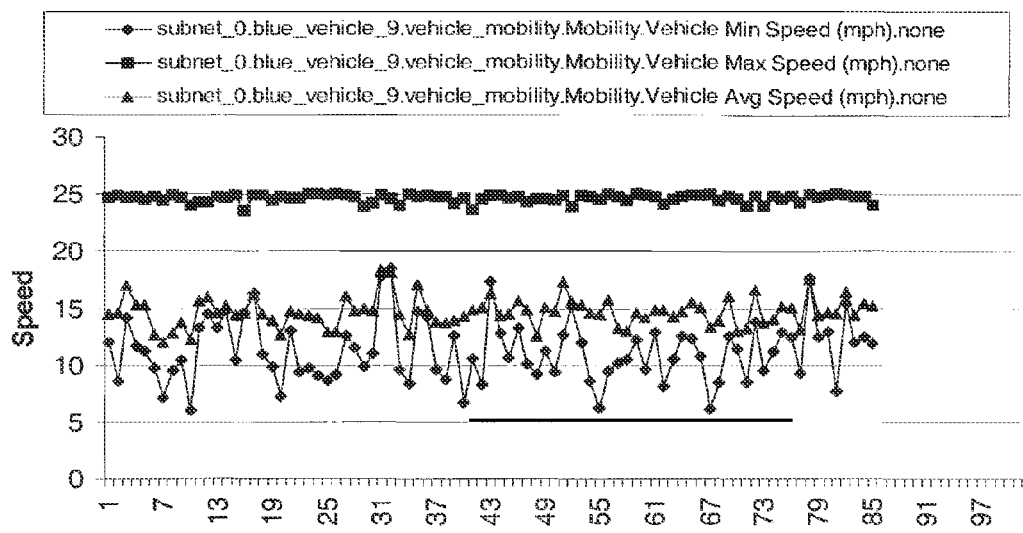
FIG. 11 is a graph showing the speed versus time of vehicle 9 in the transportation network.

Throughout the duration of the simulation, which represents 30 minutes, vehicle 9 travels solely on freeway F1 as can by seen by the arrow with label "Vehicle 9". Vehicle 9 is configured to make routing decisions solely based on a shortest path routing algorithm. As such, vehicle 9 does not attempt to cross over to any other freeways, even though they may have had less congestion and a higher speed limit. FIG. 11 shows the speed of vehicle 9 throughout the simulation and indicates that vehicle 9 travels at a maximum speed of 25 mph, the speed limit of freeway F1, until it reaches its destination at around time 85. Average and minimum speeds for vehicle 9 are also shown.

Figure 12:
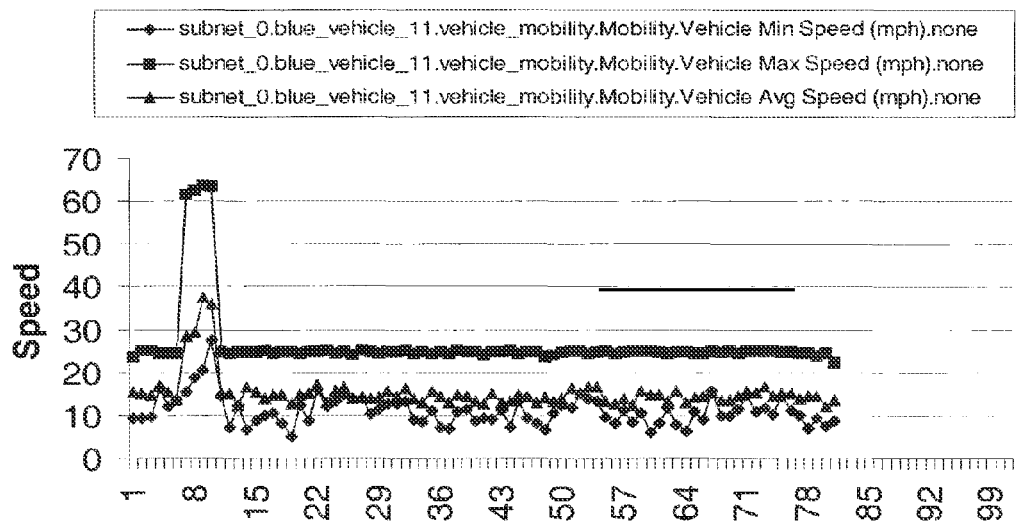
FIG. 12 is a graph showing the speed versus time of vehicle 11 in the transportation network.

The progress of vehicle 11 as it traverses the transportation network is shown in FIG. 9 by the arrow labeled "Vehicle 11". Reference is also made to FIG. 12 which graphs the speed of vehicle 11 versus simulation time. Vehicle 11 employs O-D (origin-destination) routing algorithms based on dynamic segment cost assignment such as those described above. Referring to the figures, vehicle 11 begins by traveling on F1 at a maximum speed of 25 mph until it reaches the intersection of F1 and F3 at around time 6. Based on received traffic information, and on the current map of the transportation network, vehicle 11 proceeds on F3 and begins traveling at a higher average speed, and a maximum speed of 65 mph, as evidenced by the spike shown in FIG. 12. Vehicle 11 continues on F3, while continuing to receive traffic congestion updates from the other vehicles within range, until it reaches the intersection of F2 and F3. In this example, traffic congestion information from nearby vehicles trigger the routing algorithm for vehicle 11 to characterize F2 a poorer route than an alternate route. At the intersection of F2 and F3, vehicle 11 makes a u-turn, traversing back on F3 until it reaches the intersection of F3 and F1 at around time 11. Vehicle 11 then continues on F1 at a maximum speed of 25 mph until it reaches it destination at around time 80.

Figure 13:
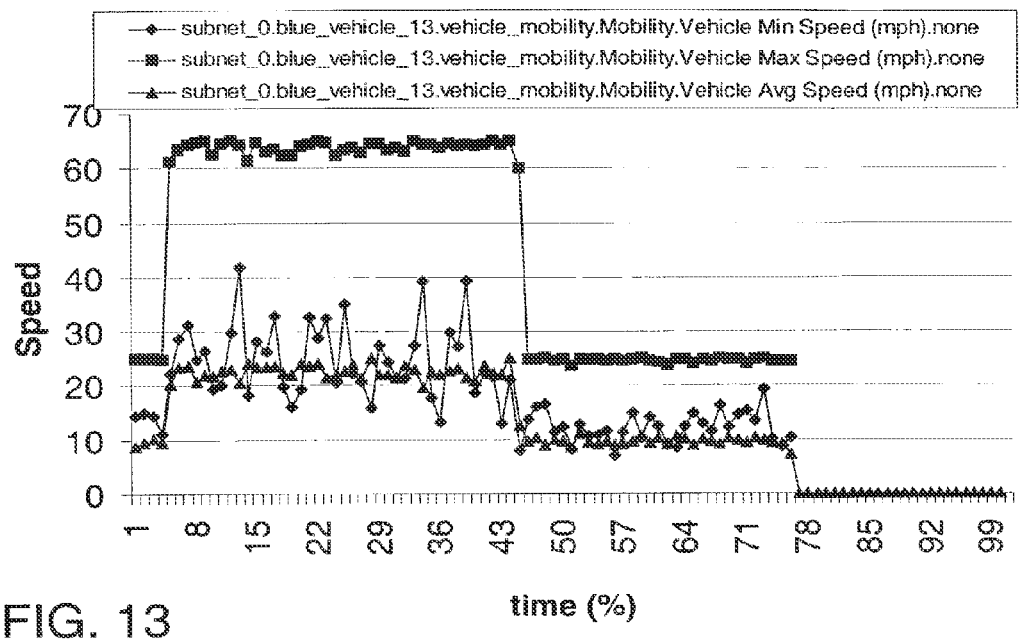
FIG. 13 is a graph showing the speed versus time of vehicle 13 in the transportation network.

Vehicle 13, employs O-D routing algorithms based on segment costs that have been pre-calculated based on the distance-to-speed ratio for each segment in the network of roads. Vehicle 13 begins on the same path as vehicle 11 traversing F1 to F2. But at the intersection of F2 and F3, vehicle 13 determines that F2 is a better choice for travel based on the a-priori calculated and fixed segment delays. With reference to both FIG. 10 and FIG. 13, which shows the speed of vehicle 13, vehicle 13 continues on F2, and then on F4, at a maximum speed of 65 mph, until the intersection of F4 and F1 at around time 46. At this intersection, vehicle 13 proceeds on F1, at a maximum speed of 25 mph, until it reaches its destination at around time 77.

Figure 14:
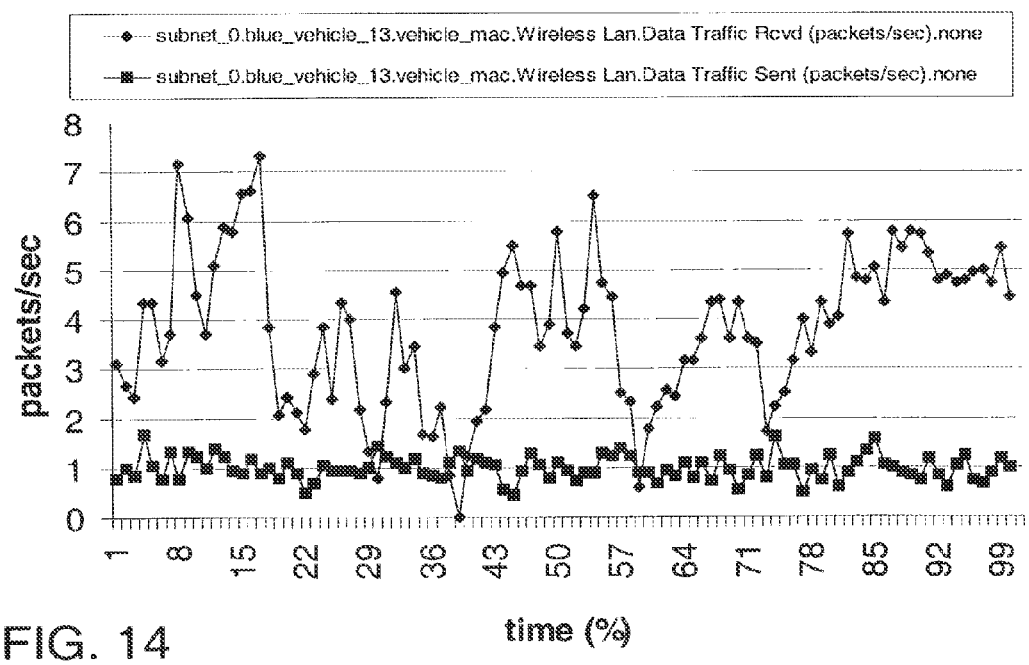
FIG. 14 is a graph showing the packets/sec sent and received by vehicle 13 while traversing the transportation network.

FIG. 14 shows the packets/sec sent and received by vehicle 13 throughout the simulation. Note the activity, particularly for the received traffic. Received packets increases until around the time vehicle 13 hits the intersection of F2 and F3 at around time 17, where vehicle 13 then continues down. Received packets then drop from a maximum of around 7.5 packets/sec to between around 1 and 5 packets/sec, indicative of more sparsely distributed vehicles, followed thereafter by varying received packet activity.

The foregoing is only one exemplary simulation, and is intended solely to illustrate some of the interactions between and operation of vehicles in a transportation network in light of the above discussions.

As shown and described, the above mobile communication device is operable with thousands of other mobile communication devices within communication range of each other, and while traveling at high speed relative to one another. It is of note that only a very small percentage of vehicles need be equipped with the mobile communication device to realize many of the benefits of the mobile communication device and the transportation application. The exact percentage of vehicles that need to be equipped to achieve real-time vehicle routing based on congestion information depends heavily on the surrounding environment, as well as the density of vehicles at a given location. For example, for major commuting arteries in a suburban-like environment, a percentage as low as 0.1% of vehicles on the roads and in communication range of each other need be equipped vehicle. Even at that percentage, traffic congestion pockets can be identified and relayed to other approaching equipped vehicles.

Database Management

Various techniques are implemented to keep the traffic database current and relevant, and to make efficient use of memory. The following is a list of database management techniques designed to limit the amount of memory needed in the communication device, reduce the bandwidth requirements imposed by mobile communication devices on the communications network, and help ensure that the traffic database remains stable. Any or all of the database management methods discussed below may be used alone or in combination with any other method, and methods not mentioned here but known by those skilled in the art may be used. Some of the methods are:

1) Compression techniques can be used to reduce the size of the traffic database prior to transmission to other equipped vehicles. For example, most of the commercially available GIS systems employ various types of spatial compression algorithms to avoid redundancies when representing or transferring map information. The traffic information map can be built as an overlay layer on existing GIS maps utilizing some of the same compression techniques.

2) Prior to exchanging database entries via VSTs or BSTs but after establishing communication between at least two equipped vehicles, negotiating which portions of the traffic databases to exchange. For example, the traffic data can be sorted according to the time stamp and only those entries more recent then a negotiated time can be transferred. Alternatively, the traffic database may be sorted according to position and the sorted entries grouped according to general geographic regions or grids. During the negotiation phase specific entries from geographic regions or grids can be requested and transferred.

3) The traffic database can be groomed such that entries older than certain dates or time periods are purged. Or the database can be groomed such that if a region as indicated in the map database has not recently been traveled, those traffic entries corresponding to the not recently traveled regions can be deleted. Additionally, database entries that correspond to areas outside of a geographic area of interest can be discarded.

4) Encryption can be used during the receipt and transmission of traffic database entries to help ensure uncompromised communications. Encryption is well understood by those of ordinary skill in the art. On-board key distribution and management can be achieved by using a certificate authority (CA) or a compact card flash card and the authentication/encryption key can be stored at regular intervals.

5) Dual traffic databases, one of them being a known stable database, can be maintained. A first stable database is used, while a second database receives traffic updates. If the new updated database is unstable, that is it is unable to converge onto good solutions for traffic flow estimation, prediction, and route determination, the first stable database is used until the updated database can be repaired or becomes stable through subsequent BST and VST updates, at which time the second updated database replaces the first database. Many commercially available database systems provide mechanisms to eliminate or reduce unstable conditions.

In the event that no stable traffic database can be created, either because there are too few equipped vehicles in the transportation network, or because there are few if any vehicles within communication range, the routes can be computed from the map database alone.

The communication device can be used in many other ways in addition to the vehicle navigation application. In one aspect of that application the devices construct BSTs and VSTs for exchanging traffic congestion information or traffic databases. The application can be adapted to construct packets comprising other data such as digitized voice data and audio data. Warning and emergency alert data, for example a broadcast alert from an emergency vehicle such as an ambulance can also be constructed and received by the communication device. Packets comprising Internet data and email data can also be constructed. Generally, the enhanced mobile communication device provides a platform for transmitting and receiving these and other types of digital data in fast moving and high density ad-hoc networks.

It is intended that the foregoing detailed description be understood as an illustration of the selected forms that the invention can take and not as a definition of the invention. It is only the following claims, including all equivalents, that are intended to define the scope of this invention.

What is claimed is:

1. A method comprising the steps of:
   initializing a transmitting frequency timer with a transmitting period;
   checking number of incoming traffic congestion packets received at a first vehicle during the transmitting period;
   adjusting the transmitting period according to the number of incoming traffic congestion packets received at the first vehicle such that the transmitting period increases as the number of traffic congestion packets received increases;
   transmitting an outgoing traffic congestion packet at a rate of once per the transmitting period;
   estimating traffic flow based on the incoming traffic congestion packets, a traffic database, a map database and a current position of the first vehicle; and
   computing an alternate route from the current position of the first vehicle to a destination based on the estimated traffic flow,
   wherein the outgoing traffic congestion packet comprises:
   a beacon service table that comprises real-time and historical data about the first vehicle; and
   a vehicle service table that comprises real-time and historical data about one or more other vehicles, the real-time and historical data about one or more other vehicles having been received in one or more of the incoming traffic congestion packets.

2. The method of claim 1 wherein the outgoing traffic congestion packet comprises a beacon service table that comprises real-time and historical data about the first vehicle.

3. The method of claim 2 wherein the real-time and historical data about the first vehicle comprise location data for the first vehicle.

4. The method of claim 2 wherein the real-time and historical data about the first vehicle comprise speed data for the first vehicle.

5. The method of claim 1 wherein the real-time and historical data about the one or more other vehicles comprise location data for the one or more other vehicles.

6. The method of claim 1 wherein the real-time and historical data about the one or more other vehicles comprise speed data for the one or more other vehicles.

7. The method of claim 1 wherein the transmission period is initialized at one second.

8. The method of claim 1 wherein the transmission period is adjusted such that the transmission period is set according to a Fibonacci series.

9. The method of claim 1 wherein the adjustment of the transmission period is used to restrict use of the wireless network to less than approximately 50%.

10. The method of claim 1 wherein the adjustment of the transmission period is used to restrict use of the wireless network to less than approximately 40%.

11. A mobile communication device comprising:
    a processor;
    a wireless transceiver in communication with the processor;
    a memory in communication with the processor, the memory comprising executable code that, when run on the processor, executes the following:
    initializing a transmitting frequency timer with a transmitting period;
    checking number of incoming traffic congestion packets received at a first vehicle during the transmitting period;
    adjusting the transmitting period according to the number of incoming traffic congestion packets received at the first vehicle such that the transmitting period increases as the number of traffic congestion packets received increases;
    transmitting an outgoing traffic congestion packet at a rate of once per the transmitting period;
    estimating traffic flow based on the incoming traffic congestion packets, a traffic database, a map database and a current position of the first vehicle; and
    computing an alternate route from a current position of the first vehicle to a destination based on the estimated traffic flow,
    wherein the outgoing traffic congestion packet comprises:
    a beacon service table that comprises real-time and historical data about the first vehicle; and
    a vehicle service table that comprises real-time and historical data about one or more other vehicles, the real-time and historical data about one or more other vehicles having been received in one or more of the incoming traffic congestion packets.

12. The mobile communication device of claim 11 wherein the wireless transceiver communicates with one or more other vehicles to exchange incoming and outgoing congestion packets.

13. The mobile communication device of claim 11 wherein the outgoing traffic congestion packet comprises a beacon service table that comprises real-time and historical data about the first vehicle.

14. The mobile communication device of claim 13 wherein the real-time and historical data about the first vehicle comprise location data for the first vehicle.

15. The mobile communication device of claim 13 wherein the real-time and historical data about the first vehicle comprise speed data for the first vehicle.

16. The mobile communication device of claim 11 wherein the real-time and historical data about the one or more other vehicles comprise location data for the one or more other vehicles.

17. The mobile communication device of claim 11 wherein the real-time and historical data about the one or more other vehicles comprise speed data for the one or more other vehicles.

18. The mobile communication device of claim 11 wherein the transmission period is initialized at one second.

19. The mobile communication device of claim 11 wherein the transmission period is adjusted such that the transmission period is set according to a Fibonacci series.

20. The mobile communication device of claim 11 wherein the adjustment of the transmission period is used to restrict use of the wireless network to less than approximately 50%.

21. The mobile communication device of claim 11 wherein the adjustment of the transmission period is used to restrict use of the wireless network to less than approximately 40%.

22. A non-transitory computer readable medium comprising instructions for execution by a processor to:
 initialize a transmitting frequency timer with a transmitting period;
 check number of incoming traffic congestion packets received at a first vehicle during the transmitting period;
 adjust the transmitting period according to the number of incoming traffic congestion packets received at the first vehicle such that the transmitting period increases as the number of traffic congestion packets received increases;
 transmit an outgoing traffic congestion packet at a rate of once per the transmitting period;
 estimate traffic flow based on the incoming traffic congestion packets, a traffic database, a map database and a current position of the first vehicle; and
 compute an alternate route from the current position of the first vehicle to a destination based on the estimated traffic flow.

* * * * *